US 11,667,471 B2

(12) United States Patent
Stock et al.

(10) Patent No.: US 11,667,471 B2
(45) Date of Patent: *Jun. 6, 2023

(54) MODULAR SPIRAL CHUTE

(71) Applicant: Stock Manufacturing and Design Co., Inc., Cleves, OH (US)

(72) Inventors: Jeremy Kirk Stock, Florence, KY (US); Jim Louis Greathouse, Loveland, OH (US)

(73) Assignee: Stock Manufacturing and Design Co., Inc., Cleves, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,115

(22) Filed: Sep. 27, 2021

(65) Prior Publication Data

US 2022/0009717 A1 Jan. 13, 2022

Related U.S. Application Data

(63) Continuation of application No. 17/018,592, filed on Sep. 11, 2020, now Pat. No. 11,155,413.

(60) Provisional application No. 62/994,562, filed on Mar. 25, 2020, provisional application No. 62/899,808, filed on Sep. 13, 2019.

(51) Int. Cl.
*B65G 11/18* (2006.01)
*B65G 11/06* (2006.01)
(52) U.S. Cl.
CPC .......... *B65G 11/183* (2013.01); *B65G 11/063* (2013.01)

(58) Field of Classification Search
None
See application file for complete search history.

(56) References Cited

U.S. PATENT DOCUMENTS

| 695,466 | A | * | 3/1902 | Lynch | B65G 11/023 |
| | | | | | 193/2 R |
| 1,312,995 | A | | 8/1919 | Lister | |
| 1,515,890 | A | | 11/1924 | Sekulski | |
| 1,515,965 | A | | 11/1924 | Pardee | |
| 1,712,714 | A | | 5/1929 | Pardee | |
| 1,722,675 | A | | 7/1929 | Pardee et al. | |

(Continued)

FOREIGN PATENT DOCUMENTS

| EP | 3945045 A1 * | 2/2022 | .......... B65G 11/063 |
| FR | 2716691 A1 * | 9/1995 | .......... E04F 11/032 |
| RU | 2537940 C1 | 1/2015 | |

*Primary Examiner* — William R Harp
(74) *Attorney, Agent, or Firm* — Wood Herron & Evans LLP

(57) ABSTRACT

A spiral chute having a center column assembly with a first center column segment is disclosed. The center column segment has a plurality of pairs of opposed apertures. The spiral chute also includes a plurality of chute assembly sections, each including a chute support arm, a chute section coupled to the chute support arm, an outer wall support coupled to a distal end of the chute support arms, an outer wall segment coupled to the outer wall supports, and a support arm bolt having a distal end and a proximal end. The distal end of each support arm bolt passes through a corresponding one of the first plurality of opposing apertures and engages a proximal end of the chute support arm such that the proximal end of the chute support arm abuts the first center column segment. A method of constructing a spiral chute is also disclosed.

19 Claims, 18 Drawing Sheets

(56) References Cited

U.S. PATENT DOCUMENTS

| | | | |
|---|---|---|---|
| 1,800,067 A | 4/1931 | Godinez | |
| 1,802,089 A | 4/1931 | Pfeiffer | |
| 2,437,259 A | 3/1948 | Kautz | |
| 3,280,993 A | 10/1966 | Wolfe | |
| 3,826,352 A | 7/1974 | Van Zon et al. | |
| 4,627,529 A | 12/1986 | Tarlton et al. | |
| 4,726,456 A | 2/1988 | Hogsett | |
| 5,154,488 A | 10/1992 | Maxon, III | |
| 5,209,323 A | 5/1993 | Hopkins | |
| 5,598,914 A | 2/1997 | Sulzer et al. | |
| 6,609,607 B2 | 8/2003 | Woltjer et al. | |
| 7,581,629 B2 | 9/2009 | Kohler | |
| 8,733,529 B2 | 5/2014 | Heddles et al. | |
| 9,296,562 B1 | 3/2016 | Van Bogaert | |
| 9,415,936 B1 | 8/2016 | Rodriguez et al. | |
| 9,809,385 B1 | 11/2017 | Van Bogaert | |
| 10,053,291 B1 | 8/2018 | Van Bogaert | |
| D846,222 S | 4/2019 | Rodriguez et al. | |
| 10,766,702 B2 | 9/2020 | Casper et al. | |
| 10,793,358 B1 | 10/2020 | Lwali et al. | |
| 11,155,413 B2 * | 10/2021 | Stock | B65G 11/183 |

* cited by examiner

MODULAR SPIRAL CHUTE

CROSS REFERENCE TO RELATED APPLICATION

This application is a Continuation of U.S. patent application Ser. No. 17/018,592 filed Sep. 11, 2020, which claims the benefit of priority to U.S. Provisional Patent Application Ser. No. 62/899,808 filed Sep. 13, 2019, and U.S. Provisional Patent Application Ser. No. 62/994,562, filed Mar. 25, 2020, the disclosures of which are incorporated by reference herein in their entirety.

TECHNICAL FIELD

The invention relates generally to chutes for moving articles, and specifically, spiral chutes for moving articles downwardly from a higher location to a lower location.

BACKGROUND

Current plastic chute designs use a fixed length stanchion and require an elaborate frame structure be connected to the stanchion to cradle and support the plastic chutes. Custom engineering is often required to meet a customer's unique on-site needs which adds to both the cost and lead time. Parts are assembled in the chute manufacturer's factory, resulting in an excessively large single piece unit that may be easily damaged and often more difficult to handle, ship, rig into the installation site, and erect at the site.

From a functional perspective, known existing designs require that all products enter from the top of the assembly. These designs do not provide access for a product to enter from the side, at different elevations and radial positions, which limits the number of products that can be fed into one chute.

SUMMARY OF THE INVENTION

To these and other ends, a spiral chute according to the invention overcomes the current limitations associated with oversized spiral chutes. In addition, the spiral chute of the invention increases the versatility of spiral chutes with respect the entry locations.

In an embodiment, a spiral chute includes a center column assembly with a first center column segment. The first center column segment has a plurality of pairs of opposed apertures arranged in a spiral configuration. The spiral chute further includes a first plurality of chute assembly sections. Each chute assembly section includes a) a chute support arm; b) a chute section coupled to the chute support arm; c) an outer wall support coupled to a distal end of the chute support arm; d) an outer wall segment coupled to the outer wall supports; and e) a support arm bolt having a distal end and a proximal end. The distal end of each support arm bolt passes through a corresponding one of the first plurality of opposing apertures and engages a proximal end of the chute support arm such that the proximal end of the chute support arm abuts the first center column segment. In one aspect, the first center column segment may include a plurality of retaining slots in a spiral configuration and the proximal end of the chute support arm may include a retaining tab that is inserted into a corresponding one of the plurality of retaining slots. The proximal end of the chute support arm may include a center flange that abuts the center column segment. In another aspect, the center column assembly may include a cap segment coupled to the first center column segment. In yet another aspect, the distal end of the support arm bolt threadingly engages a nut secured to the chute support arm to secure the chute support arm to the first center column segment.

In one embodiment, the center column assembly includes a second center column segment coupled to the first center column segment and the spiral chute further includes a second plurality of chute assembly sections with the respective chute support arms abutting the second center column segment.

The spiral chute may further include an upper entry chute assembly coupled to an uppermost one of the chute assembly sections and a discharge chute assembly coupled to a lowermost one of the chute assembly sections. In addition, a side entry chute assembly may be disposed between the upper entry chute assembly and the discharge chute assembly.

In another embodiment, the spiral chute includes a handrail operatively coupled to the first plurality of chute assembly sections. In addition, the outer wall support may include a retaining tab with an aperture and a lower retaining tab, and a handrail support post may rest upon the lower retaining tab and extend through the aperture in the upper retaining tab. The handrail support post may be operatively coupled to the handrail such that the handrail is disposed above the chute assembly sections.

In another embodiment, the spiral chute further includes a base and the center column assembly further includes a base connector disposed between and operatively coupled to the base and the first center column segment. In one aspect, the base connector includes a notch and the first center column segment includes a tab that resides in the notch so as to index the first center column segment in a predetermined orientation. In another aspect, a connector sleeve is disposed partially into the base connector and partially into the first center column segment. A lower clamp bar extends through the base connector and the connector sleeve and an upper clamp bar extends through the first center column segment and the connector sleeve. A fastener connects the upper clamp bar to the lower clamp bar so as to retain the first center column segment against the base connector. The connector sleeve may include a stiffening bar extending across opposing sides of the connector sleeve.

The invention also includes a method of constructing a spiral chute. The method includes supporting a first center column segment in a vertical orientation, where the first center column segment has a plurality of pairs of opposed apertures arranged in a spiral configuration. The method further includes coupling a first plurality of chute assembly sections to the center column segment where each chute assembly section includes a) a chute support arm; b) a chute section coupled to the chute support arm; c) an outer wall support coupled to a distal end of the chute support arms; d) an outer wall segment coupled to the outer wall supports; and e) a support arm bolt having a distal end and a proximal end. The distal end of each support arm bolt passes through the center column segment and engages a proximal end of the chute support arm such that the proximal end of the chute support arm abuts the first center column segment.

In one embodiment, the first center column segment includes a plurality of retaining slots in a spiral configuration, and the method further incudes inserting a retaining tab at the proximal end of the chute support arm into a corresponding one of the plurality of retaining slots.

In yet another embodiment, the method further includes coupling a second center column segment to the first center column segment and coupling a second plurality of chute assembly sections to the second center column segments such that the respective chute support arms abut the second center column segment.

In one embodiment, supporting the first center segment further includes securing a base to a support surface and coupling a base connector to the base and the first center column segment. In one aspect, coupling the base connector further includes a) inserting a connector sleeve partially into the base connector and partially into the first center column segment; b) extending a lower clamp bar though the base connector and the connector sleeve; c) extending an upper clamp bar through the first center column segment and the connector sleeve; and d) connecting a fastener between the upper clamp bar and the lower clamp bar so as to retain the first center column segment against the base connector.

In one embodiment, the base connector includes a notch and the first center column segment includes a tab, coupling the base connector to the first center column segment further includes inserting the tab of the first center column segment into the notch of the base connector so as to index the first center column segment in a predetermined orientation.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION OF THE DRAWINGS

Figure 1:
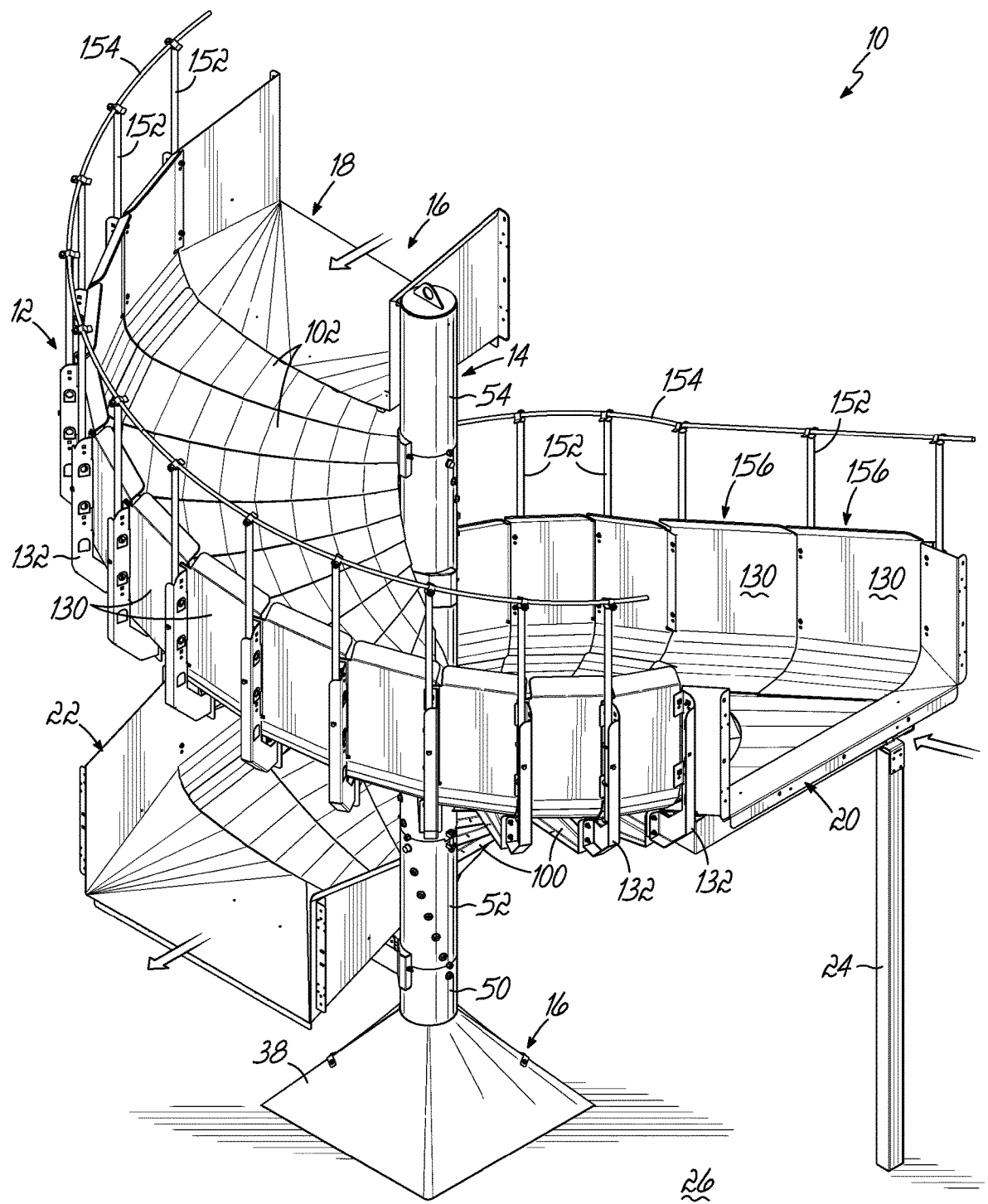
FIG. 1 is a perspective view of a spiral chute according to an exemplary embodiment of the invention.
Figure 2:
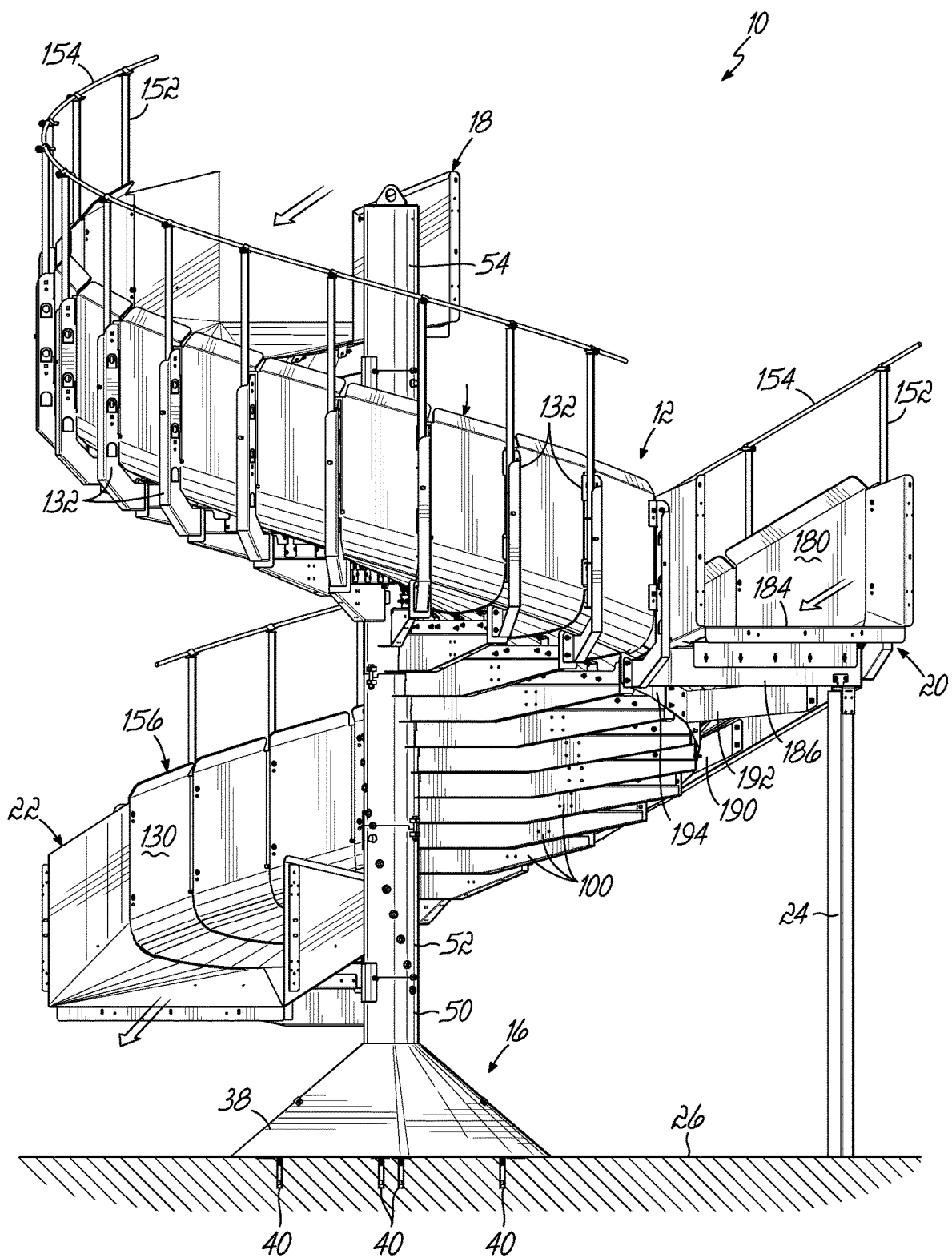
FIG. 2 is an elevational view of the spiral chute of FIG. 1.

A spiral chute 10 according to one preferred embodiment of the invention is shown in FIGS. 1 and 2. The spiral chute 10 includes a main chute assembly 12, a center column assembly 14, a base assembly 16, an upper entry chute assembly 18, a side entry chute assembly 20, and a discharge chute assembly 22. The main chute assembly 12 shown in FIGS. 1 and 2 makes one complete rotation (360°) around the center column assembly 14 such that the upper entry chute assembly 18 is positioned essentially directly above the discharge chute assembly 22. Because of the modular design of the spiral chute 10, the degree to which the main chute assembly 12 traverses around the center column assembly 14 can vary from as little as 15° to any angle greater than 360°. In most installations, the main chute assembly 12 will be constructed in 90° increments. In that respect, the main chute assembly 12 in FIGS. 1 and 2 is considered to be made up of four 90° increments. The spiral chute 10 shown in FIGS. 1 and 2 is considered a left-hand turn chute. The spiral chute 10 may be constructed as a right-hand turn chute as well.

The main chute assembly 12 shown in FIGS. 1 and 2 has only one side entry chute assembly 20. In an embodiment, the main chute assembly 12 may have no side entry chute assembly 20 such that the objects may be placed onto the main chute assembly 12 only via the upper entry chute assembly 18. In another embodiment, the main chute assembly 12 may have more than one side entry chute assembly 20 spaced between the upper entry chute assembly 18 and the discharge chute assembly 22. The side entry chute assembly 20 may be supported by a support post 24 which extends between a support surface 26, such as a concrete floor, and the bottom of the side entry chute assembly 20.

Figure 3:
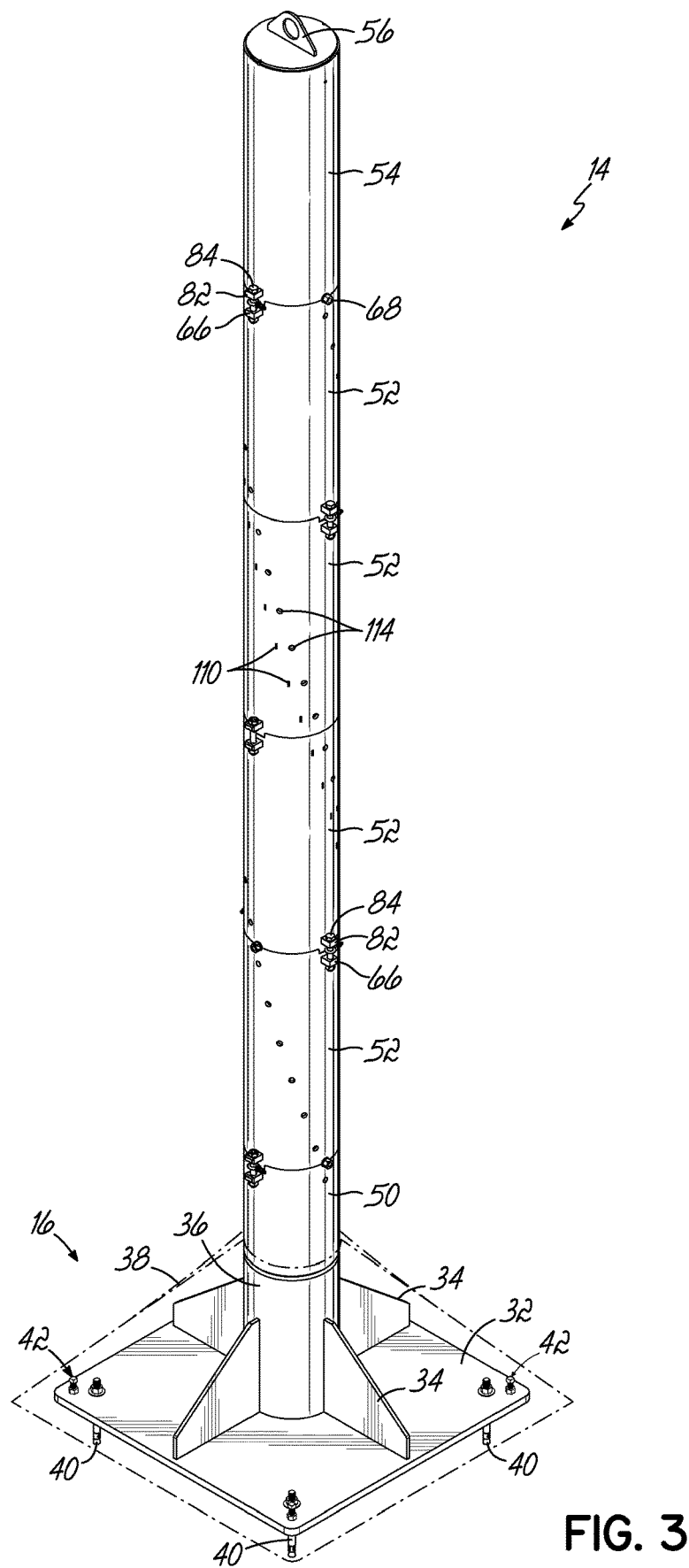
FIG. 3 is a perspective view of the center column assembly and the base assembly of the spiral chute of FIG. 1.

With reference to FIG. 3, the center column assembly 14 and the base assembly 16 are illustrated with the main chute assembly 12 removed for the sake of clarity. The base assembly 16 includes a base plate 32, base gussets 34, a center column receiving member 36, and a base cover 38 (FIGS. 1 and 2). The spiral chute 10 may be secured to the support surface 26 via one or more base anchors 40, such as anchor bolts. The base plate 32 may be leveled using leveling members 42 located at each of the four corners of the base plate 32. Each leveling member 42 includes a threaded member 44 (FIG. 4B) coupled to a jack pad (not shown) located underneath the base plate 32. By turning one or more of the threaded members 44, the leveling members 42 may be used to level the base plate 32 when it is placed on an uneven support surface 26. The overall height of the center column assembly 14 may be increased or decreased by changing the height of the base assembly 16. The overall height of the center column assembly 14 may also be increased or decreased by increasing or decreasing the length of the center column segments 52. The length of each center column segments 52 does not have to be the same, as some center column segments 52 may be longer or shorter than other center column segments 52. By changing the height of the center column assembly 14, the height of the upper entry chute assembly 18, the side entry chute assembly, and the discharge chute assembly 22 may be increased or decreased as desired.

The center column assembly 14 includes a base connector 50, a center column segment 52, and cap segment 54. The base connector 50 is configured to slide inside center column receiving member 36. In an embodiment, a center column assembly 14 will have at least of one base connector 50, one center column segment 52, and one cap segment 54. The cap segment 54 may include a lifting lug 56 that a lifting device may be attached to lift the center column assembly 14 for positioning it at the desired location on the support surface 26. In that configuration, the main chute assembly will traverse 90° around the center column assembly 14. If the main chute assembly needs to extend another 90°, the additional center column segment 52 may be added. The center column assembly 14 in FIG. 3 has four center column segments 52 and accordingly, the main chute assembly 12 traverses 360° around the center column assembly 14 as discussed above. Additional center column segments 52 may be added beyond the four shown in FIG. 3 depending on the installation requirements.

Figure 4A:
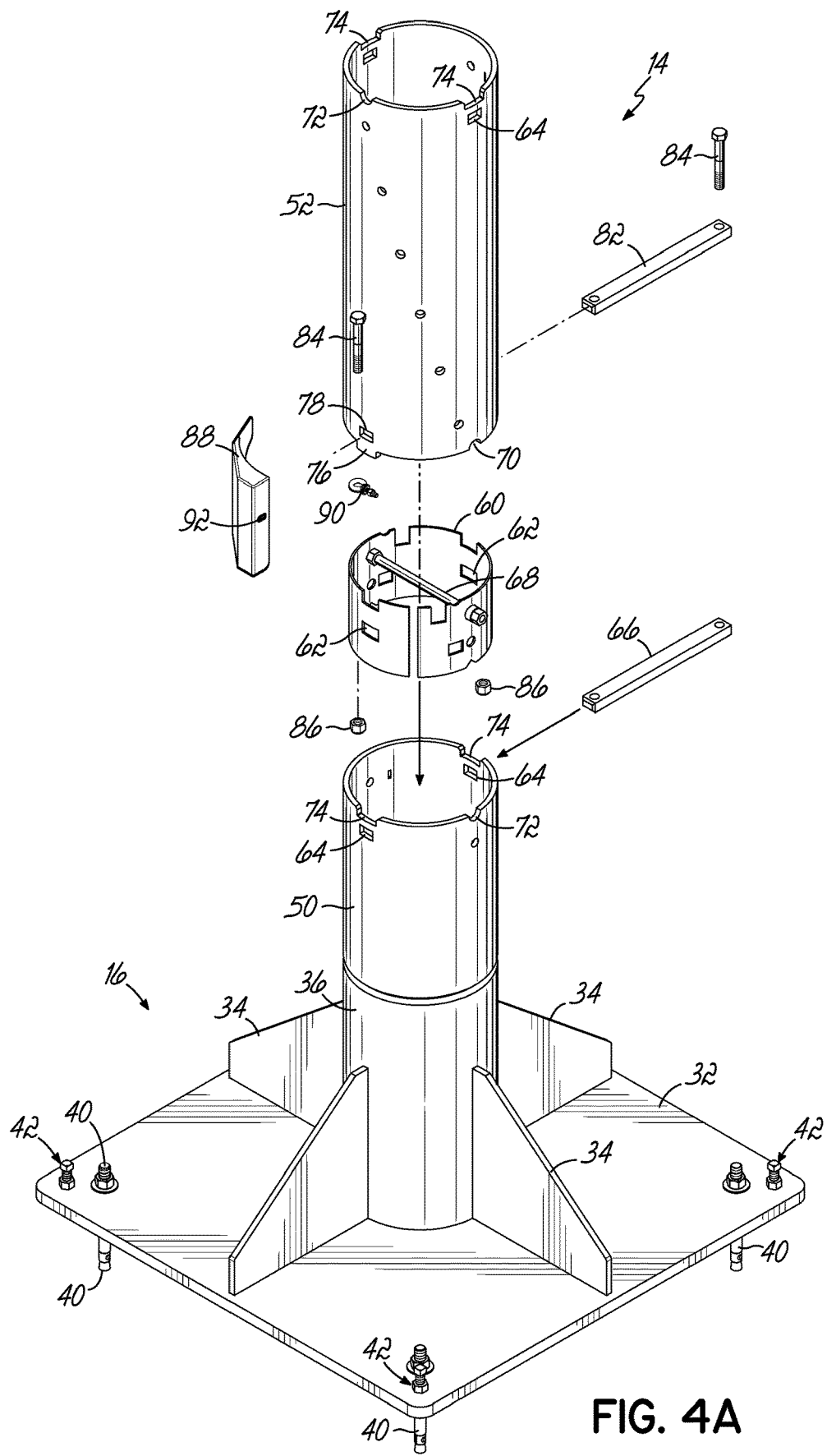
FIG. 4A is a partially disassembled perspective view of the center column assembly and the base of the spiral chute of FIG. 1.
Figure 4B:
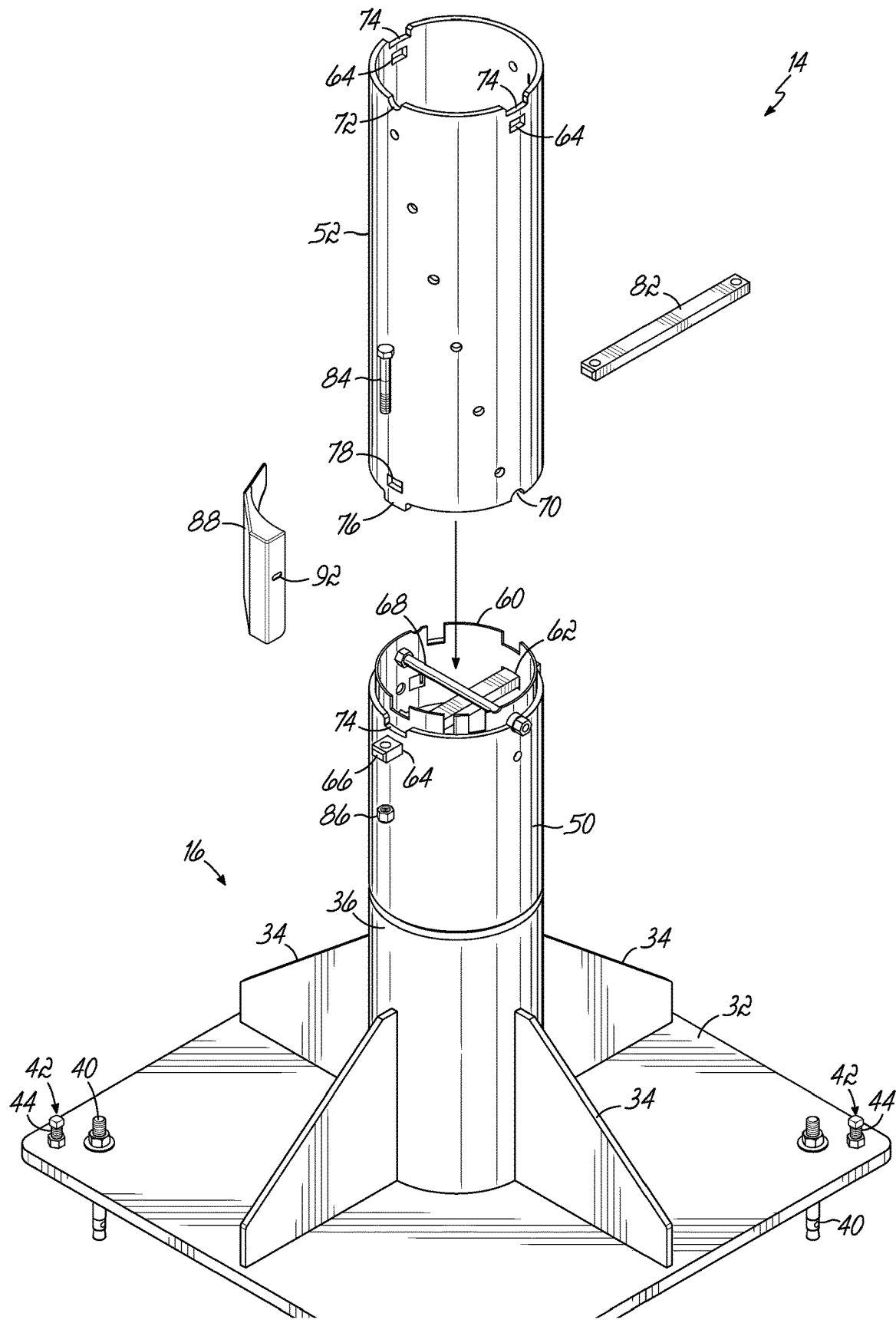
FIG. 4B is a partially disassemble perspective view of the center column assembly and the base of the spiral chute of FIG. 1.
Figure 4C:
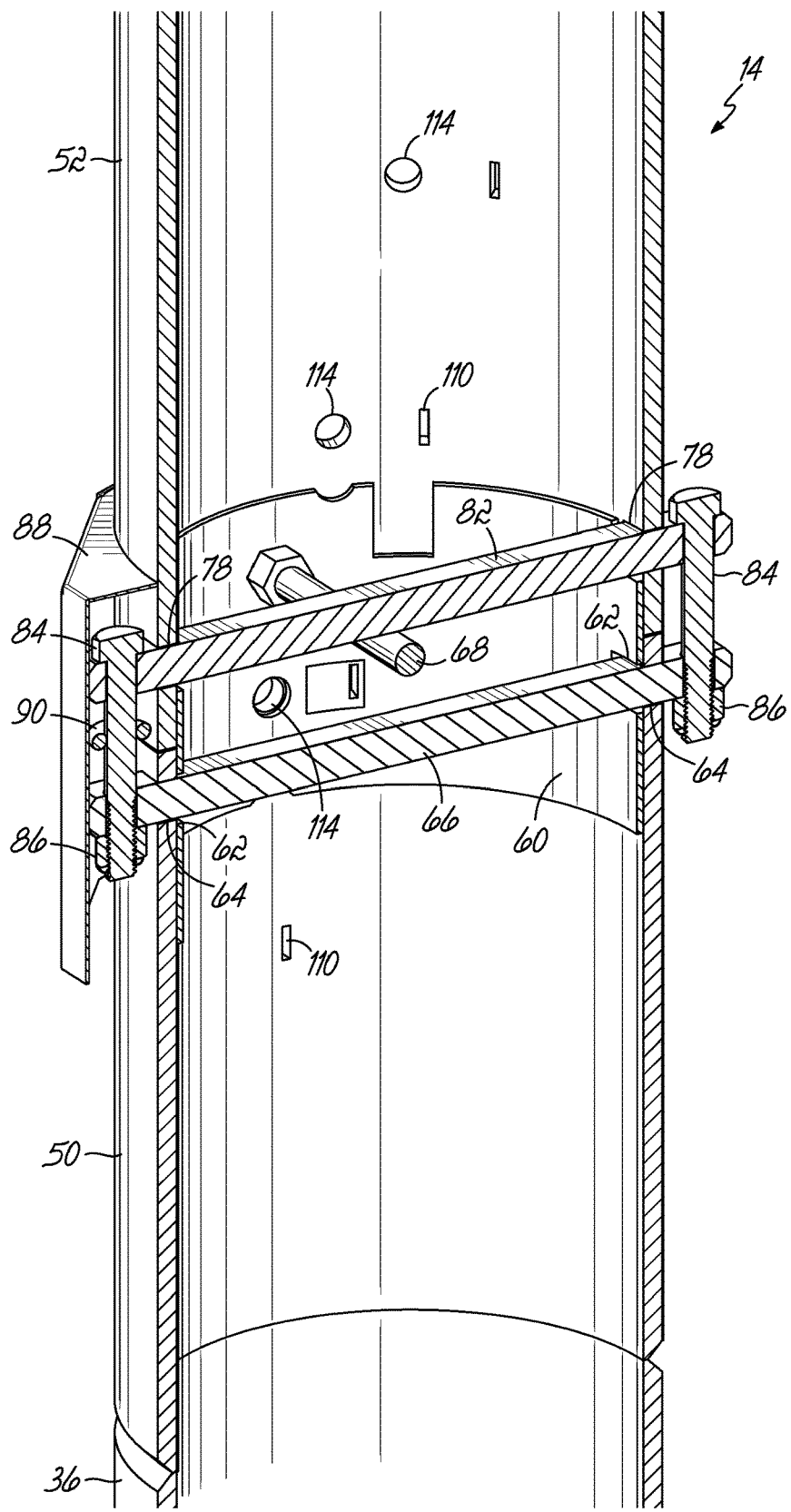
FIG. 4C is a generally longitudinal cross-sectional view of the center column assembly of the spiral chute of FIG. 1.

FIGS. 4A-4C illustrate how the center column segment 52 are coupled to the base connector 50. A connector sleeve 60 is partially inserted into the top of the base connector 50 until apertures 62 on the connector sleeve 60 are aligned with apertures 64 in the base connector 50. A lower clamp bar 66 is then inserted through the apertures 62, 64. A stiffening bar 68 may be connected across the connector sleeve 60 to increase the rigidity of the connector sleeve 60. The center column segment 52 and the base connector 50 have complementary semi-circular recesses 70, 72 to receive the exposed end of the stiffening bar 68 when the center column segment 52 and the base connector 50 are fitting together. The center column segment 52 is then placed upon the top of the base connector 50 with the connector sleeve 60 being positioned partially inside the lower end of the center column segment 52. To that end, the base connector 50 includes notches 74 and the center column segment 52 includes that tabs 76 that are configured to fit within the notches 74. The tabs 76 and notches 74 insure that the center column segment 52 is indexed in a predetermined radial orientation relative to the base connector 50. With the center column segment 52 placed on the base connector 50, apertures 78 at the lower end of the center column segment 52 are aligned with notches 80 at the top of the connector sleeve 60. In this configuration, another upper clamp bar 82 is inserted through the apertures 78. Fasteners 84 are inserted through both the upper and lower clamp bars 66, 82 and nuts 86 are threaded onto the fasteners 84. A clamp bar cover 88 may be used to cover at least one of the exposed ends of the upper and lower clamp bars 66, 82. An eyebolt 90 cooperating with one of the fasteners 84 retains clamp bar cover 88 via aperture 92 in the clamp bar cover 88.

Figure 5A:
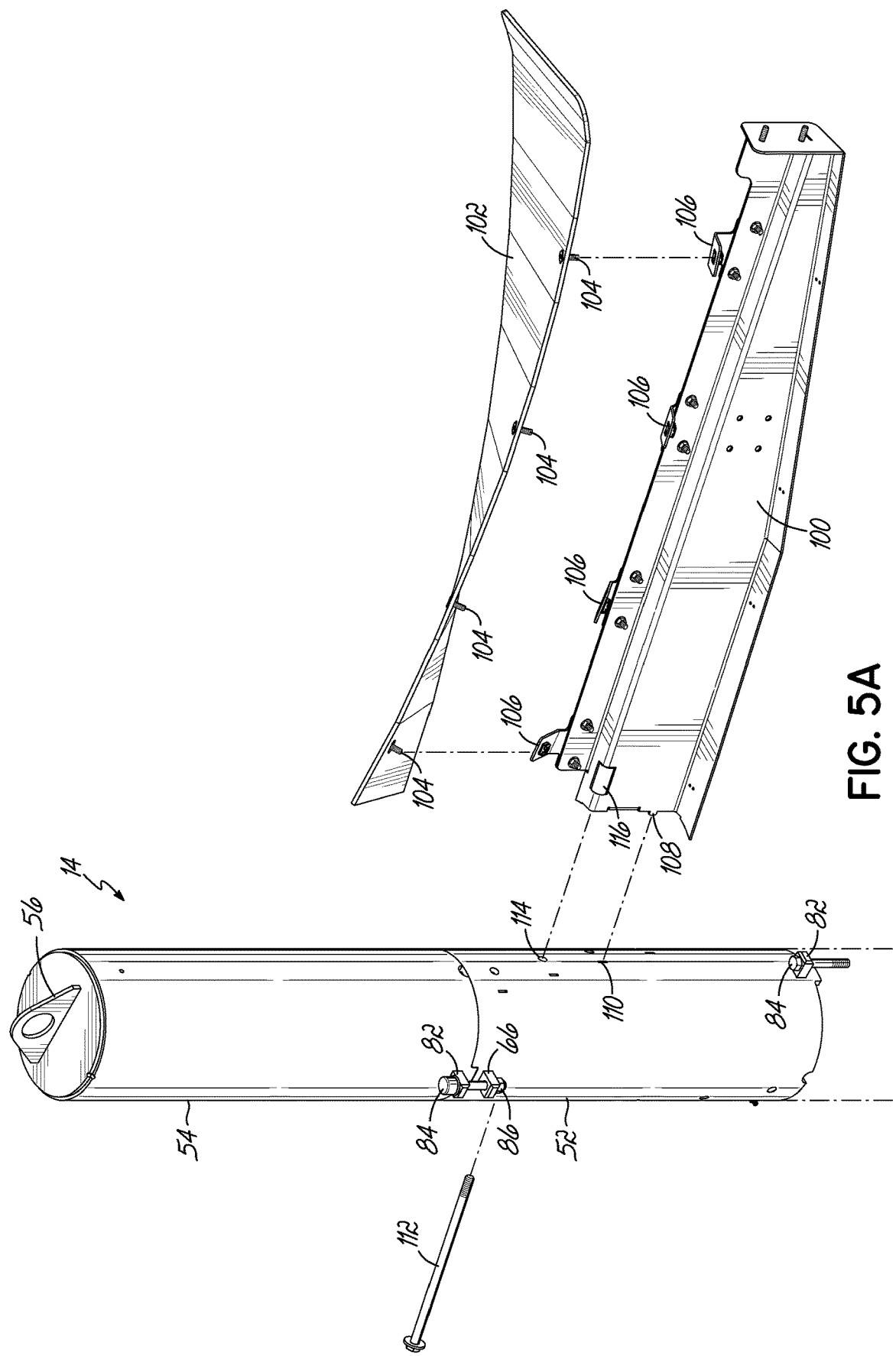
FIG. 5A is a partially disassembled perspective view of a chute support arm and a chute section to be affixed to the stanchion.
Figure 5B:
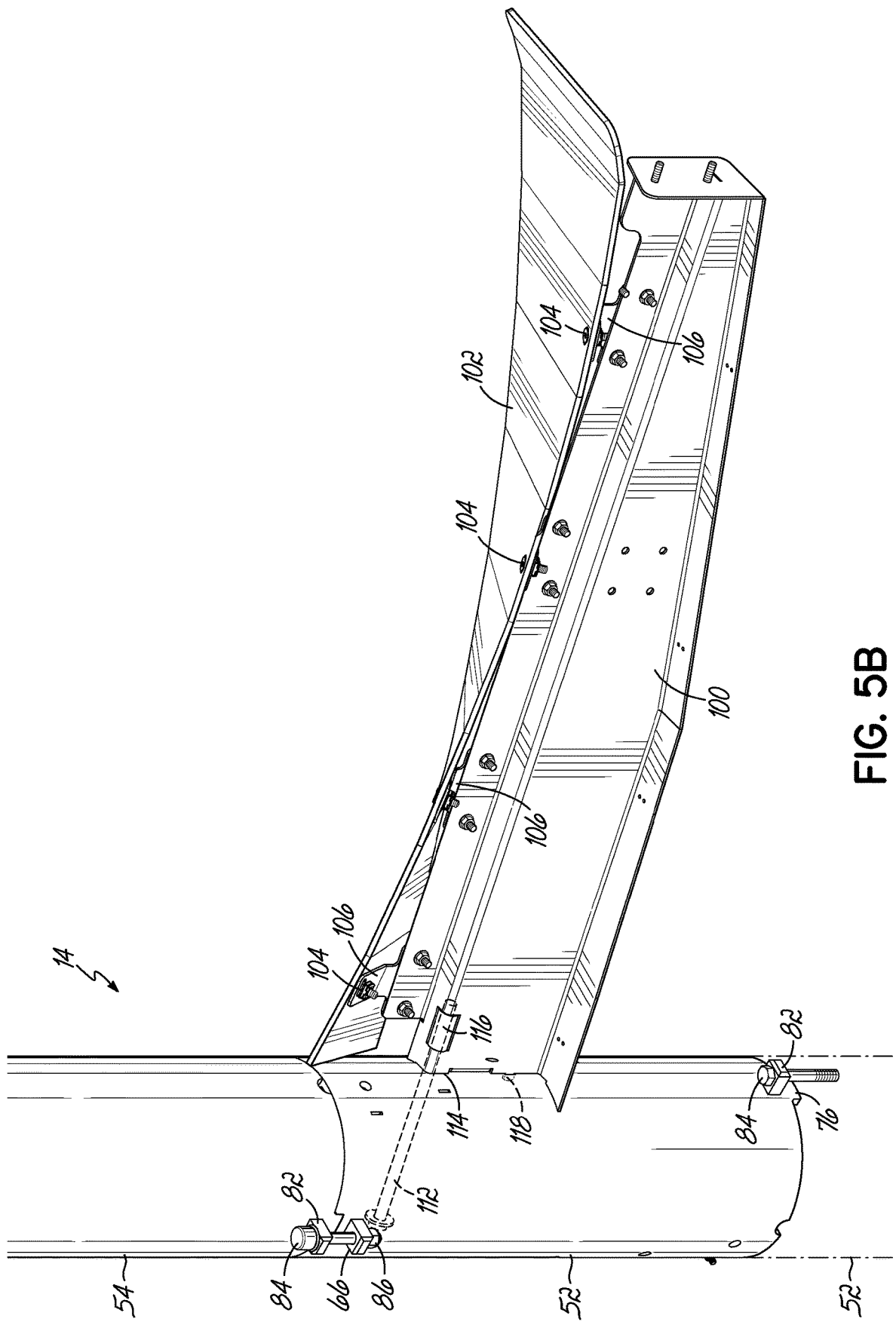
FIG. 5B is a perspective view of the chute support arm and the chute section affixed to the stanchion.
Figure 5C:
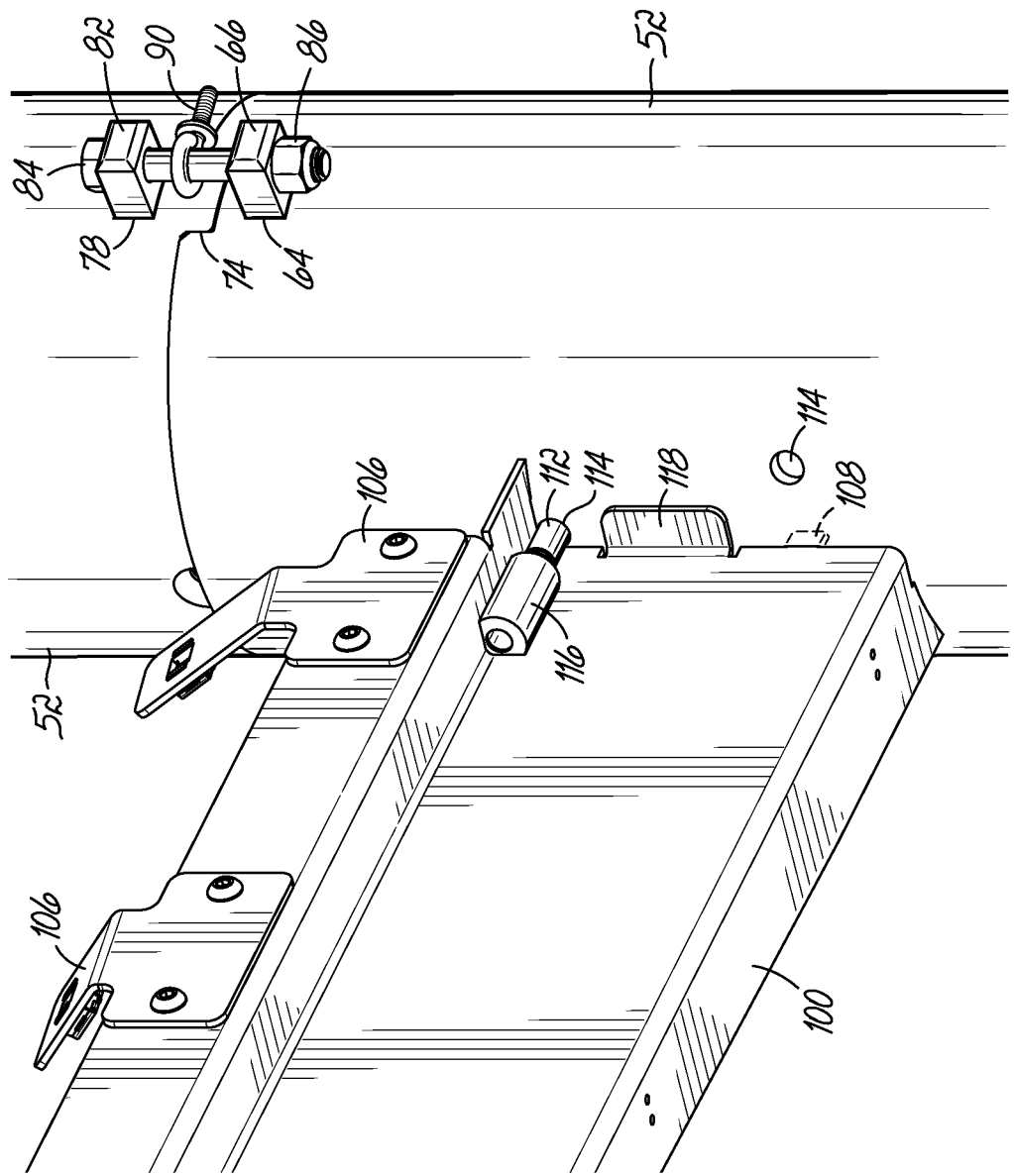
FIG. 5C is a bottom perspective view of the chute support arm coupled to the center column assembly.

With reference to FIGS. 5A-5C, the main chute assembly 12 includes a chute support arm 100 and a chute section 102 removably coupled to the chute support arm 100 via fasteners 104 cooperating with connector tabs 106. The chute support arm 100 includes a retaining tab 108 that is configured to be inserted inside a corresponding retaining slot 110 on the center column segment 52 when the chute support arm 100 is attached to the center column segment 52 (FIG. 5B). Each center column segment 52 has a plurality of pairs of opposed apertures 114 arranged in a spiral configuration along the longitudinal length of the center column segment.

A distal end of a chute support arm bolt 112 is inserted through a corresponding pair of opposing apertures 114 in the center column segment 52 and is threadingly coupled to nut 116. The head of the chute support arm bolt 112 at its proximal end prevents the chute support arm bolt 112 from passing through aperture 114 on the opposite side from where the chute support arm 100 is attached. A center flange 118 (FIG. 5C) abuts the exterior surface of the center column segment 52 when the chute support arm 100 is attached to the center column segment 52. The center flange 118 helps to stabilize the chute support arm 100 and keeps it from pivoting radially about the center column segment 52. In an embodiment, the chute section 102 may abut or almost abut the exterior surface of the center column segment 52 when the chute support arm 100 is attached to the center column segment 52 with the support arm bolt 112. Consequently, there is little to no gap between the inner end of the chute section 102 and the exterior surface of the center column segment 52. Advantageously, normally-sized objects (e.g., packages) sliding down the main chute assembly 12 will not fall between the inner end of the chute section 102 and the exterior surface of the center column segment 52. During assembly of the main chute assembly 12, the chute sections 102 may be layered such that the downstream edge of one chute section 102 rests at least partially atop the upstream edge of the downstream adjacent chute section 102. This arrangement allows the objects to slide down the main chute assembly 12 without being hindered by the upstream edge of the next, upcoming chute section 102. In an embodiment, the chute section 102 may include one or more "slow-down" features to keep objects sliding down the main chute assembly 12 from going above a predetermined speed.

In an embodiment, each center column segment 52 may carry six chute support arms 100 that change in elevation by 24 inches in a 90° sweep. In that embodiment, adjacent chute support arms 100 are spaced apart every 15° of rotation and 4 inches in elevation. In other embodiments, the elevation changes in a 90° sweep may range between 12 inches and 36 inches.

During assembly the center column assembly 14 may be fully assembled before the chute support arms 100, chute sections 102, outer wall support 132, and outer wall segments 130 are installed. Alternatively, the center column assembly 14 could be partially built with the base connector 50 and one center column segment 52 and then a number of the chute support arms 100, chute sections 102, outer wall support 132, and outer wall segments 130 may be installed. Then another center column segment 52 may be added to continue the assembly process.

Figure 6A:
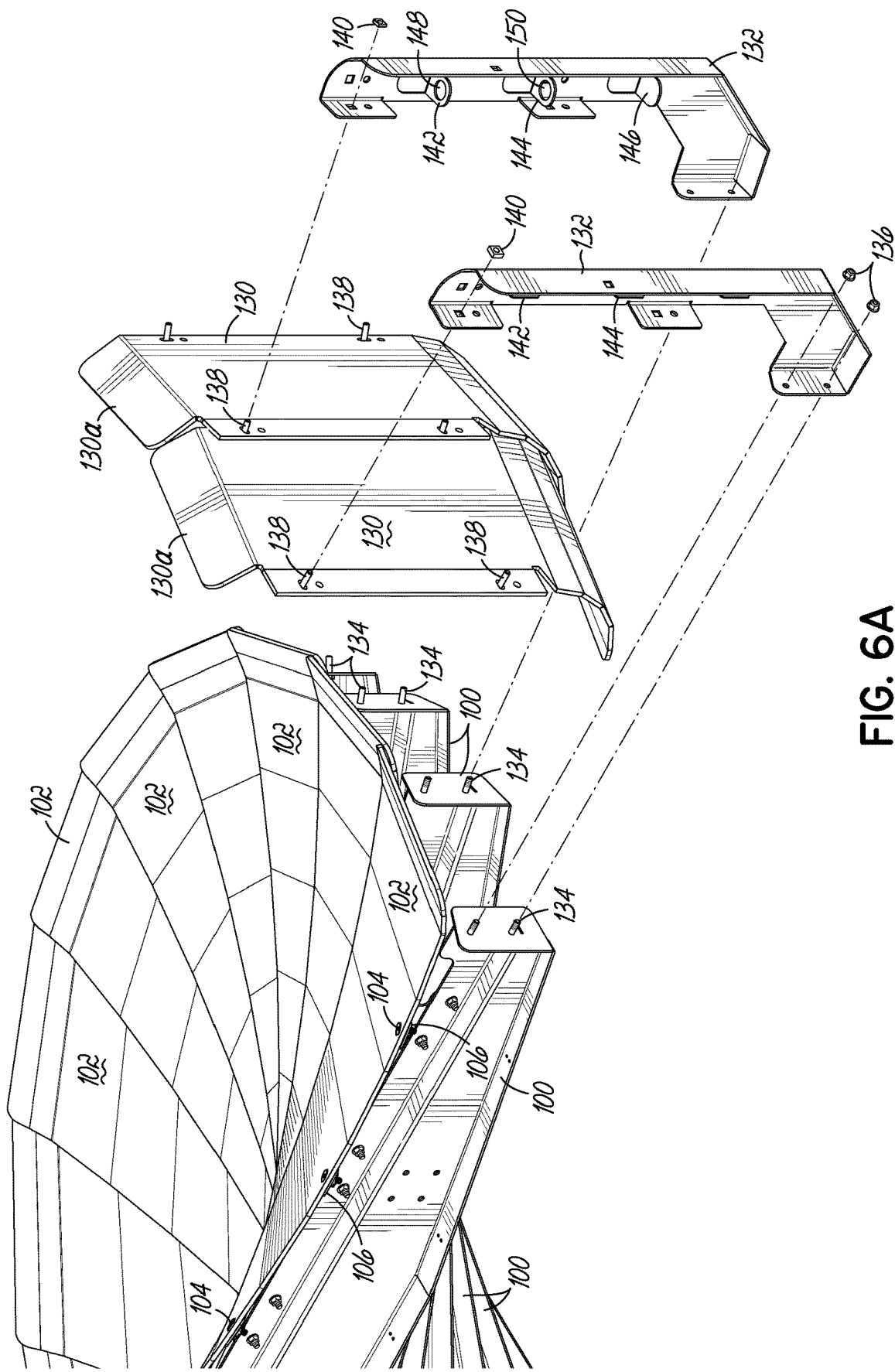
FIG. 6A is a partially disassembled perspective view of outer wall sections and outer wall section support to be attached to the spiral chute in FIG. 1.
Figure 6B:
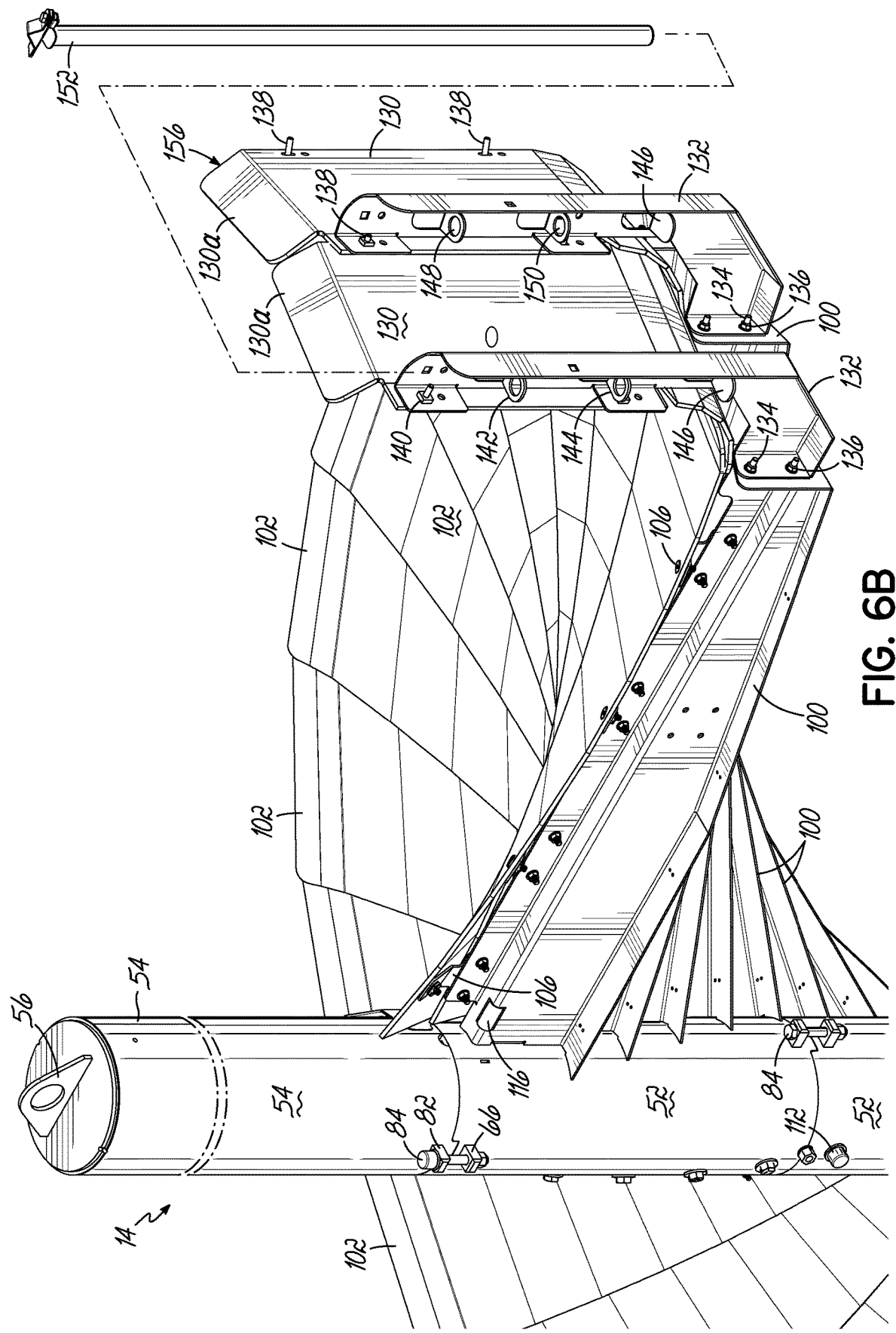
FIG. 6B is a perspective view of the outer wall sections and outer wall section supports are affixed to the spiral chute in FIG. 1.
Figure 6C:
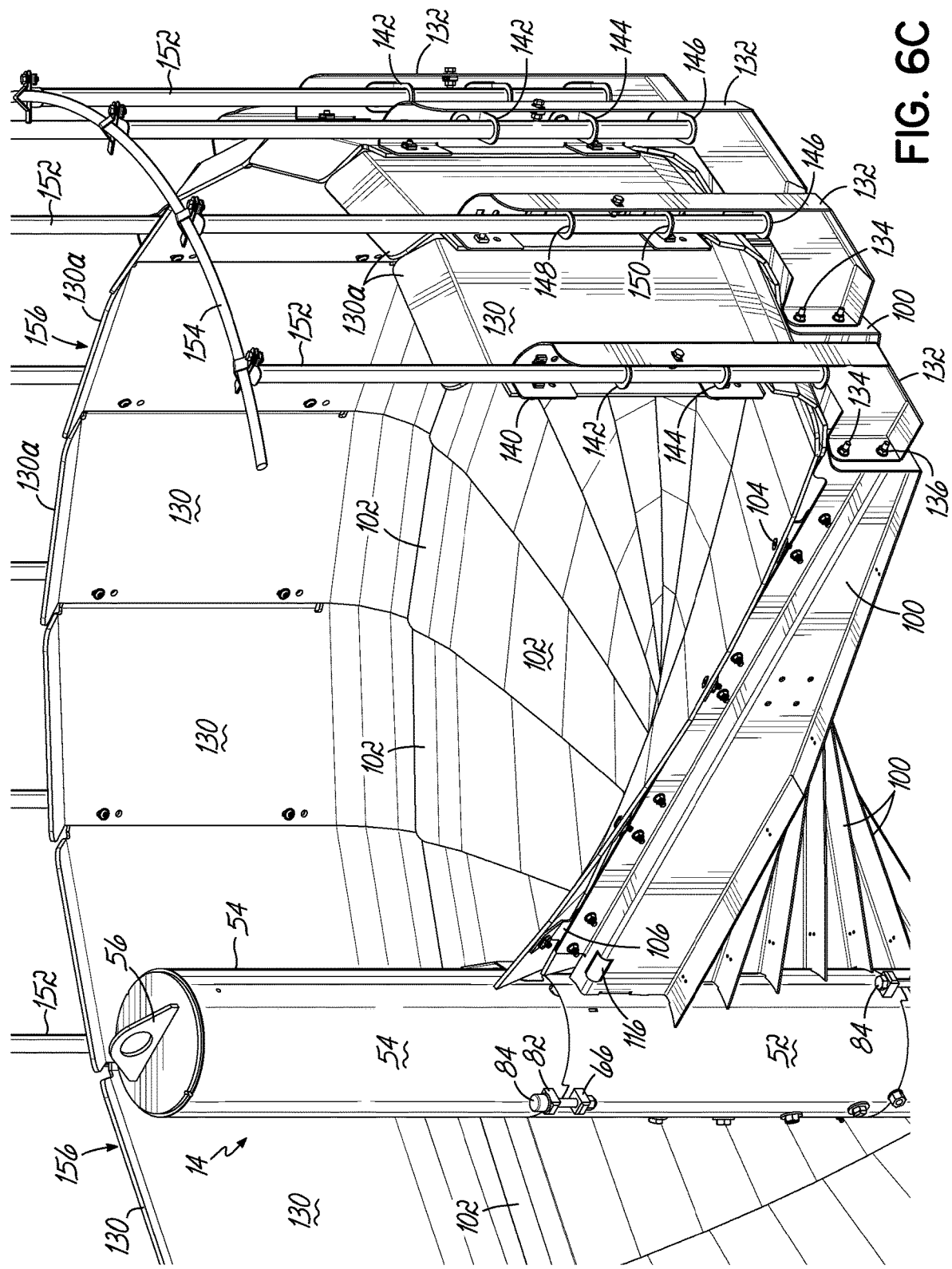
FIG. 6C is a perspective view of the spiral chute of FIG. 1 with the top and side entry chute assemblies and the bottom discharge chute assembly removed.

With reference to FIGS. 6A-6C, after the chute support arms 100 are attached to the center column assembly 14, outer wall segments 130 may be attached to the chute support arms 100. To that end, an outer wall support 132 is attached to the outer end of the chute support arm 100 via fasteners 134 and nuts 136. The outer wall segment 130 is attached to the outer wall support 132 with fasteners 138 and nuts 140. Like the chute sections 102, the outer wall segments 130 are staggered. That is, the downstream edge of one outer wall segment 130 rests at least partially atop the upstream edge of the downstream adjacent outer wall segment 130. Again, this arrangement helps the object slide down the main chute assembly 12. In addition, the chute section 102 and outer wall segment 130 are configured to provide a smooth curved surface to help bias objects moving down the main chute assembly 12 toward the center of the main chute assembly 12 and away from the outer wall segments 130. As shown in FIGS. 6A and 6B, an upper portion 130a of the outer wall segment 130 is tilted inwardly toward the center column assembly 14. In other embodiments, the upper portion 130a may take other shapes or configurations depending on the requirements of the installation site or the objects going down the main chute assembly 12. In an embodiment, the chute sections 102 and outer wall segments 130 may be constructed of recycled UHMW that is formulated with anti-static properties. Other components of the spiral chute 10 (e.g., side walls 164, 166, 180, 182, 200, 202 and bottom walls 168, 184, 204) may be constructed of recycled UHMW with anti-static properties, including components of the upper entry chute assembly 18, the side entry chute assembly 20, and the discharge chute assembly 22.

In an embodiment and with further reference to FIG. 6B, each outer wall support 132 may include an upper retaining tab 142, a middle retaining tab 144, and a lower retaining tab 146. Upper retaining tab 142 may include an aperture 148 and middle retaining tab 144 may include an aperture 150. A handrail support post 152 may be inserted through apertures 148, 150 so the end of the handrail support post 152 may rest upon lower retaining tab 146 that does not have an aperture. As shown in FIG. 6C, a handrail 154 may be coupled to and extend between the free ends of each handrail support post 152. The handrail 154 may extend the entire length of the main chute assembly 12 or it may extend only partially along the main chute assembly as shown FIGS. 1 and 2.

Figure 6D:
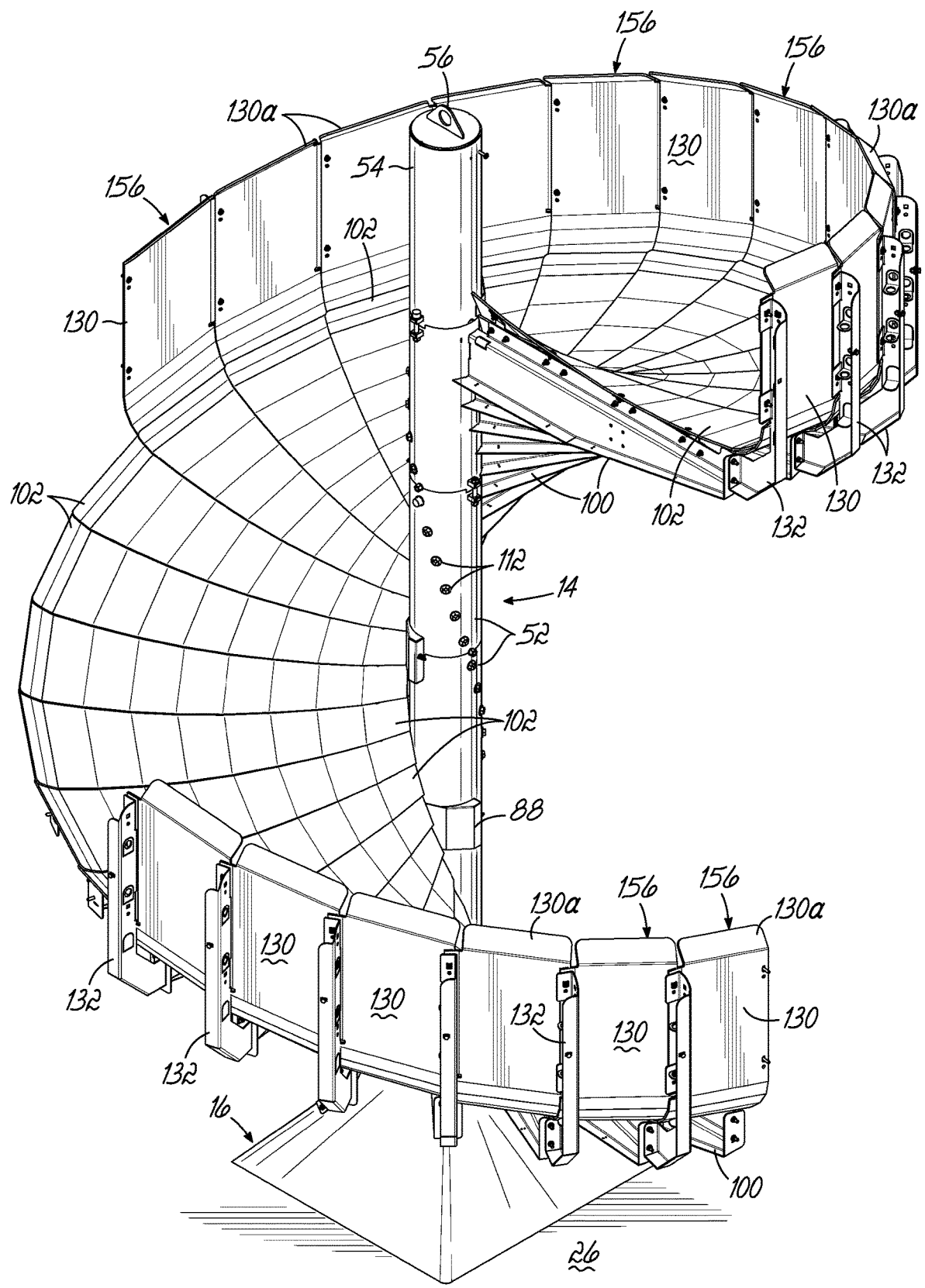
FIG. 6D is a perspective view of the spiral chute of FIG. 1 prior to installation of the upper entry assembly, the side entry assembly, and the discharge chute assembly.

The main chute assembly 12 may be formed by a plurality of chute assembly sections 156 that are coupled to the center column assembly 14 as illustrated in FIG. 6D. Each chute assembly section 156 includes the chute support arm 100, the chute section 102, the outer wall segment 130, the outer wall support 132, and the support arm bolt 112, which couples the chute assembly section 156 to the center column assembly 14.

In an embodiment, the distance between the exterior surface of the center column assembly 14 and the outer wall segment 130 may be between 24 inches and 72 inches, and more preferably 48 inches. In an embodiment the chute section 102 and the outer wall segment 130 may be formed as a single piece. In an embodiment, the surfaces of the chute section 102, the outer wall segment 130, the upper entry chute assembly 18, the side entry chute assembly 20, and the discharge chute assembly 22 may be textured, smooth, layered, or a combination thereof.

Figure 7A:
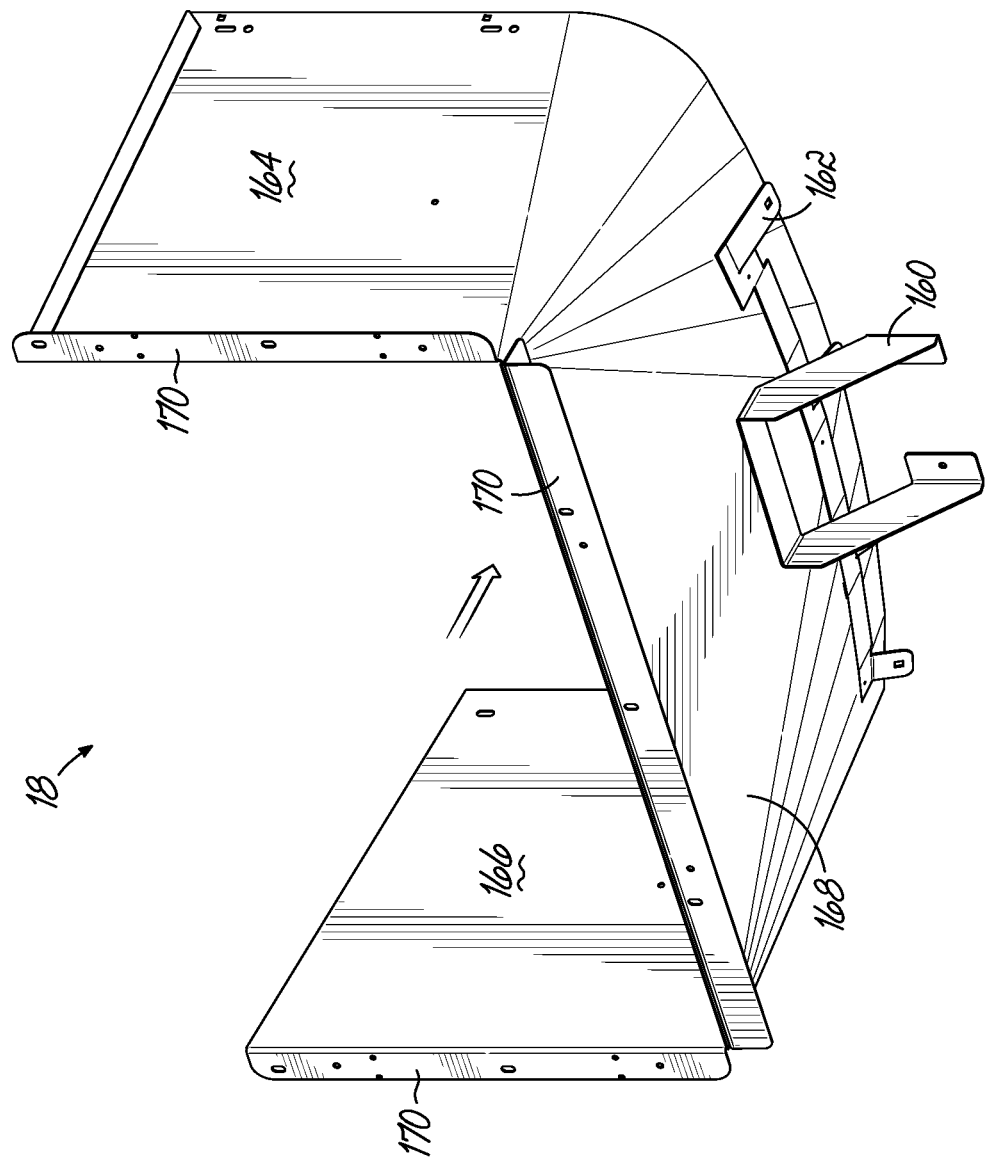
FIG. 7A is a perspective view of the top entry chute assembly of the spiral chute of FIG. 1.
Figure 7B:
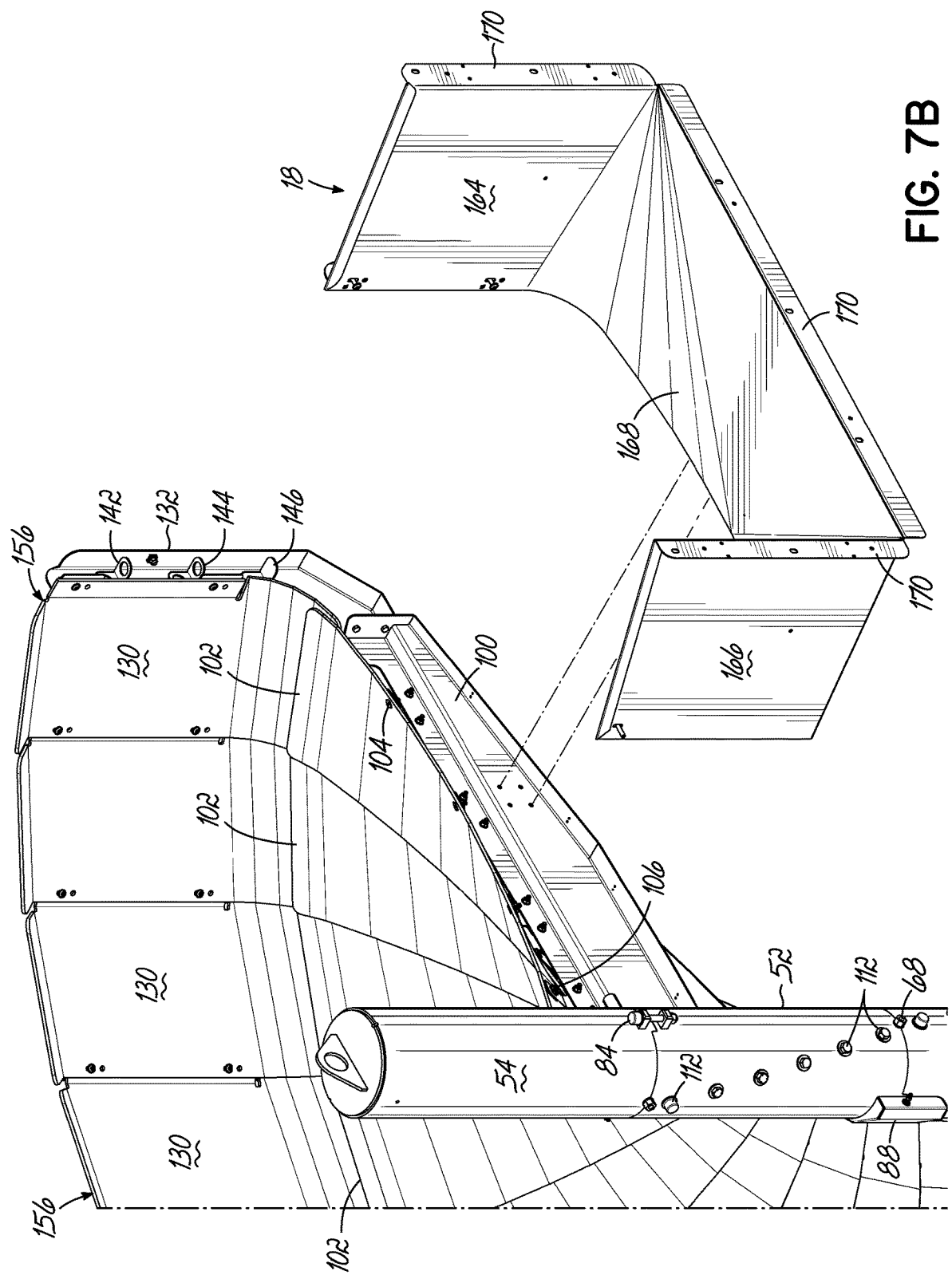
FIG. 7B is a partially disassembled perspective view of the top entry chute assembly being installed at the top of the spiral chute of FIG. 1.

With reference to FIGS. 7A and 7B, the upper entry chute assembly 18 attaches to the upper most chute support arm 100 via bracket 160 and connecting frame 162. The upper entry chute assembly 18 includes side walls 164, 166 and a bottom wall 168. Perimeter flanges 170 abut side walls 164, 166 and bottom wall 168 along their respective upstream edges. The side wall 164 is configured to be attached to the adjacent outer wall segment 130. The perimeter flanges 170 are configured to be attached to an incoming conveyor (not shown), for example, bringing objects towards and transferring them to the main chute assembly 12.

Figure 8A:
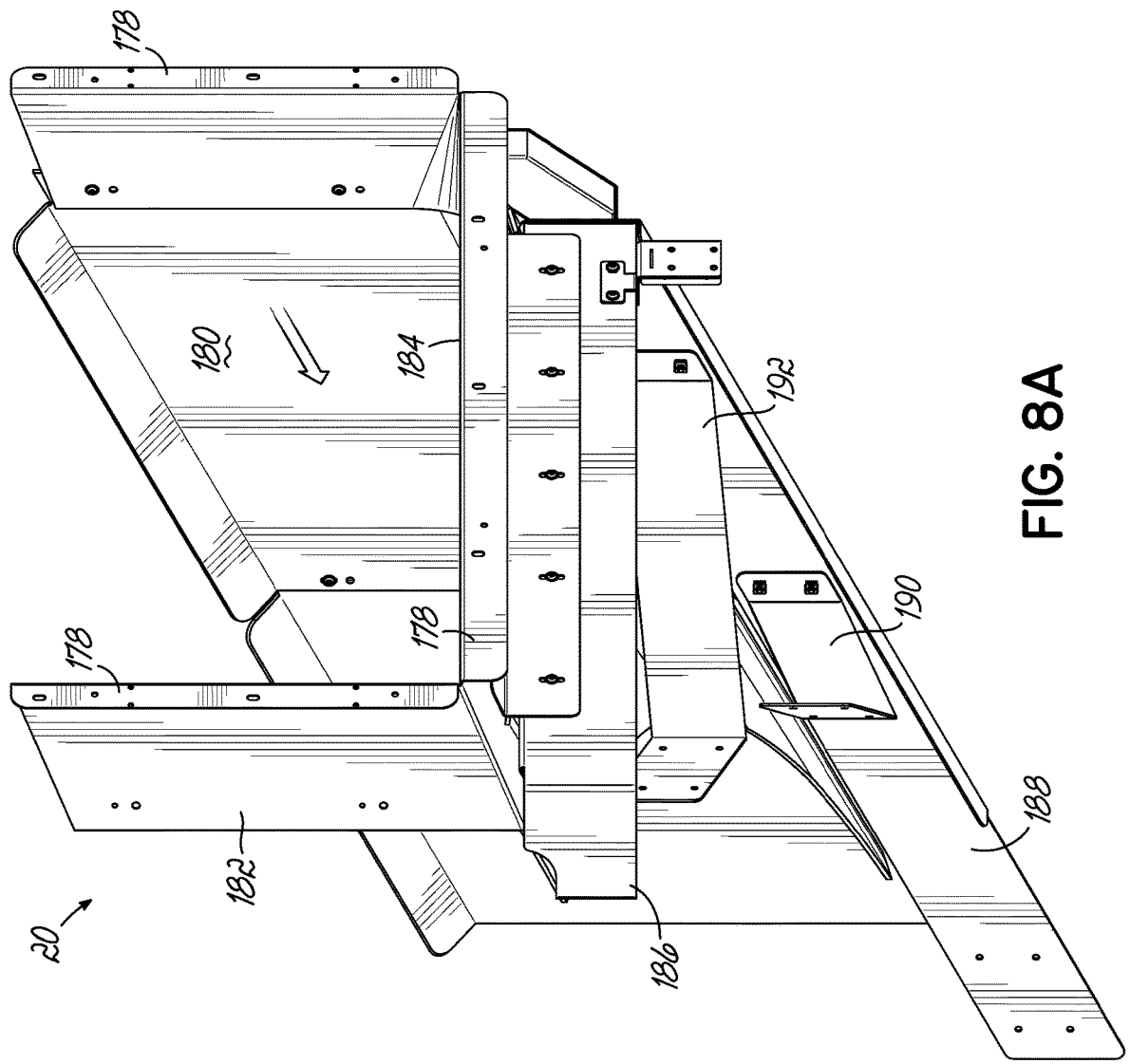
FIG. 8A is a perspective view of the side entry chute assembly of the spiral chute of FIG. 1.
Figure 8B:
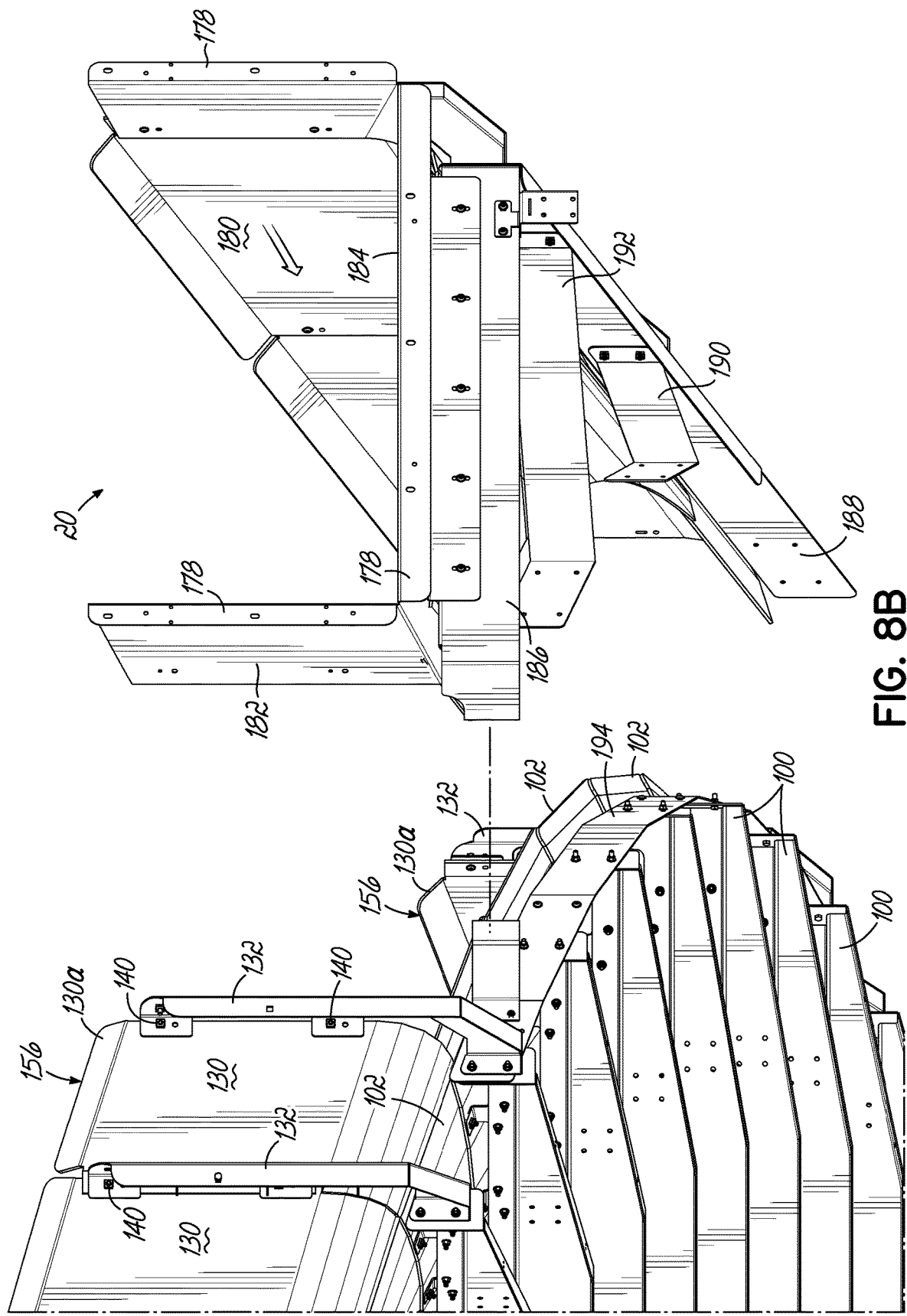
FIG. 8B is a partially disassembled perspective view of the side entry chute assembly alongside the spiral chute of FIG. 1.

As noted above, the embodiment of the spiral chute 10 in FIG. 1 includes side entry chute assembly 20 located approximately mid-way down the main chute assembly 12 between the upper entry chute assembly 18 and the discharge chute assembly 22. With reference to FIGS. 8A and 8B, the side entry chute assembly 20 includes side walls 180, 182 and a bottom wall 184. Perimeter flanges 178 abut side walls 180, 182 and bottom wall 184 along their respective upstream edges. The perimeter flanges 178 are configured to be attached to an incoming conveyor (not shown), for example, bringing objects towards and transferring them to the main chute assembly 12. The side entry chute assembly 20 includes an outer stiffener 186, an inner stiffener 188, and braces 190, 192. A side entry support 194 is affixed to the distal ends of certain chute support arms 100 that do not have outer wall supports 132 affixed to them. The outer stiffener 186, the inner stiffener 188, and braces 190, 192 are configured to be affixed to the side entry support 194 via fasteners. When the side entry chute assembly 20 is attached to the main chute assembly 12, the side walls 180, 182 are attached to the adjacent outer wall segments 130. In an embodiment, additional side entry chute assemblies 20 may be added to the main chute assembly 12 as required by the needs at the installation site.

Figure 9:
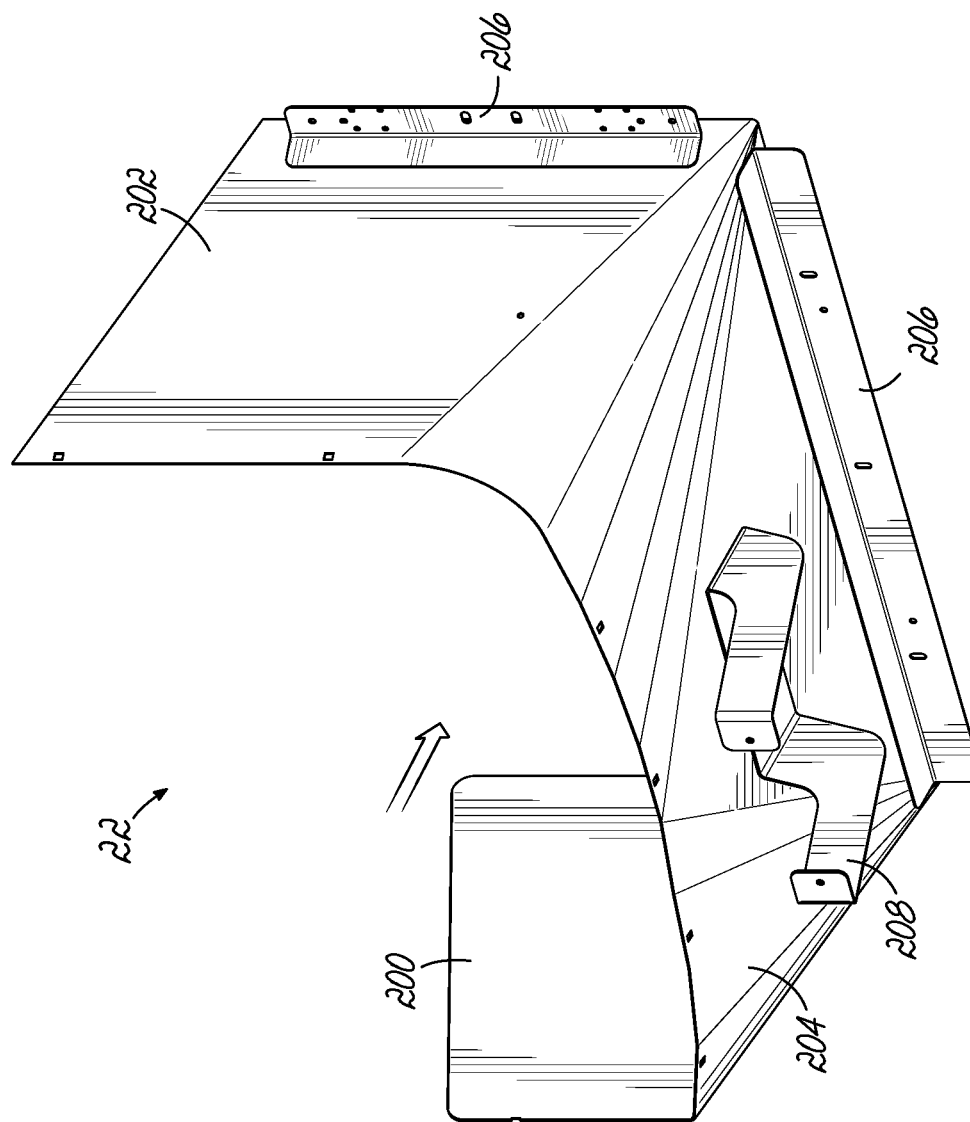
FIG. 9 is a perspective view bottom discharge chute assembly of the spiral chute of FIG. 1.

With reference to FIG. 9, the discharge chute assembly 22 includes side walls 200, 202 and bottom wall 204. Perimeter flanges 206 abut side walls 200, 202 and bottom wall 204 along their respective downstream edges. The perimeter flanges 206 are configured to be attached to a receiving conveyor (not shown), for example, to receive and carry away objects being discharged from the main chute assembly 12. The discharge chute assembly 22 includes a bracket 208 which is configured to be affixed to the last chute support arm 100. The side wall 202 is configured to be attached to the last outer wall segment 130 and the bottom wall 204 is configured to be attached to the last chute section 102. In an embodiment, the downstream end of the discharge chute assembly 22 may be at least 6 inches above the support surface 26 and, more preferably, 24 inches above the support surface 26. Practically speaking, the height of the discharge chute assembly 22 above the support surface 26 is limited only by the ceiling height at the installation facility.

The embodiment of the spiral chute 10 described and illustrated herein used curved bottom chute sections 102. It will be appreciated that in other embodiments chute sections 102 with flat bottoms may also be used on the spiral chute 10.

The modularity of the different components of the spiral chute 10 means that the spiral chute 10 may be assembled either fully at the manufacturing facility and shipped to a customer's installation site as a complete unit or sub-assemblies may be built, packed, and shipped to the customer's installation site for final assembly. Shipping sub-assemblies may significantly reduce shipping and handling costs and minimize the risk of damage to the spiral chute 10. For example, the spiral chute 10 does not require a frame structure to be constructed around the center column and the chute panels laid thereon. Instead, a sub-assembly of the chute section 102 connected to the chute support arm 100 may be attached to the center column one-by-one by a single installer. See FIGS. 5A and 5B. The modularity and "bolt-on" design of the spiral chute 10 eliminates the need for welding components together and makes replacing a worn or damaged part easy and efficient. Moreover, replacement parts may be readily stocked and replaced without the need to be welded onto the spiral chute 10.

The design of the center column assembly 14 allows for the overall height of the spiral chute 10 to be modified to suit the needs of the customer's installation site. Moreover, the locations of the upper entry chute assembly 18, the side entry chute assembly 20, and the discharge chute assembly 22 may be changed to accommodate the incoming and outgoing conveyor system at the customer's site, even after the initial installation of the spiral chute 10.

The invention also contemplates a method for assembling the spiral chute 10. One exemplary, non-limiting assembly methodology is descried below. Variations of the described methodology are within the scope of the invention.

At the installation site, position the base assembly 16 in the desired location on the support surface 26. Level the base assembly 16 using the leveling members 42 and jack pads. Once level, secure the base assembly 16 to the support surface 26 with the base anchors 40. Insert the base connector 50 inside the center column receiving member 36. With reference to FIGS. 4A-4C, insert the connector sleeve 60 into the top of the base connector 50 and insert the lower clamp bar 66 through the apertures 62, 64. Ensure that the stiffening bar rests in the semi-circular recess 72. Place a center column segment 52 over the exposed section of the connector sleeve 60 and ensure that the tabs 76 in the center column segment 52 rests within notches 74 in the connector sleeve 60. Insert the upper clamp bar 82 through apertures 78 and install fasteners 84 to the opposing ends of the upper clamp bar 82 and the lower clamp bar 66 with nut 86, ensuring that each of the fasteners 84 goes through the eyebolt 90 between the upper clamp bar 82 and the lower clamp bar 66. Ensure that the outside diameters of the base connector 50 and the center column segment 52 are aligned, then tighten the stiffening bar 68 until the connector sleeve 60 is tight against the inside of the center column segment 52. Next, tighten the nuts 86 so as to securely couple the center column segment 52 to the base connector 50. As the nuts 86 are tightened, measure the distance between the upper clamp bar 82 and the lower clamp bar 66 to check that they remain parallel to each other.

At this point, another center column segment 52 may be added to the top of the center column segment 52 that was just secured to the base connector 50 to increase the overall height of the center column assembly 14. In that regard, the previous steps of inserting a connector sleeve 60 and attaching another center column segment 52 explained above are repeated. When installing the next (upper) center column segment 52, the tabs 76 should be placed in the notches 74 such that the apertures 114 in the (upper) center column segment 52 run in a continuous spiral with the apertures 114 in the adjacent (lower) center column segment 52. Additional center column segments 52 are added until the desired height for the upper entry chute assembly 18 is reached. The cap segment 54 is secured to the uppermost center column segment 52 completing the construction of the center column assembly 14 as illustrated in FIG. 3.

Starting at the lowermost center column segment 52, insert the chute support arm bolt 112 through the apertures 114. Position a chute support arm 100 with a chute section 102 attached to it so that the chute support arm bolt 112 engages the nut 116. As the chute support arm bolt 112 threads into the nut 116, insert the retaining tab 108 into retaining slot 110. Complete tightening the chute support arm bolt 112 into nut 116 to draw the chute support arm into firm contact with the exterior surface of the center column segment 52. Install the clamp bar cover 88 with the eyebolt 90. Install the remaining chute support arms 100 with the chute sections 102 up the entire height of the center column segments 52.

Starting again at the bottom, attach an outer wall support 132 to the distal end of the lowermost chute support arm 100 via fasteners 134 and nuts 136. Slide the curved bottom of an outer wall segment 130 under the chute section 102 and up against the outer wall support 132 and secure it via fasteners 138 and nuts 140. Repeat this process until each outer wall support 132 and outer wall segment 130 are attached to the remaining chute support arms 100.

Attach the upper entry chute assembly 18, the side entry chute assembly 20 (if required by at that installation site), and the discharge chute assembly 22 in their respective locations. Install the base cover 38 to complete the base assembly 16. The handrail 154 may also be installed depending on the needs of the installation site.

While the invention has been illustrated by a description of various embodiments, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the applicant's general inventive concept.

We claim:

1. A spiral chute comprising:
    a center column assembly including a first center column segment, the first center column segment being circular in transverse cross-sectional shape and having a plurality of pairs of opposed apertures arranged in a spiral configuration;
    a first plurality of chute assembly sections, each including a chute support arm having proximal end and a distal end, the chute support arm having a nut secured to the proximal end;
    a chute section coupled to the chute support arm;
    an outer wall support coupled to a distal end of the chute support arm;
    an outer wall segment coupled to the outer wall supports; and
    a support arm bolt having a distal end and a proximal end, wherein the distal end of each support arm bolt passes through a corresponding one of the first plurality of opposing apertures and threadingly engages the nut at the proximal end of the chute support arm such that the proximal end of the chute support arm abuts the first center column segment, whereby, at each chute assembly section, the spiral chute is defined at a radially interior by the first center column segment and at a radially exterior by the outer wall segment.

2. The spiral chute of claim 1, wherein the center column assembly includes a second center column segment coupled to the first center column segment and the spiral chute further comprises a second plurality of chute assembly sections with each respective chute support arm abutting the second center column segment.

3. The spiral chute of claim 1 further comprising:
    an upper entry chute assembly coupled to an uppermost one of the first plurality of chute assembly sections; and
    a discharge chute assembly coupled to a lowermost one of the first plurality of chute assembly sections.

4. The spiral chute of claim 3 further comprising:
    a side entry chute assembly disposed between the upper entry chute assembly and the discharge chute assembly.

5. The spiral chute of claim 1 further comprising:
    a handrail operatively coupled to the first plurality of chute assembly sections.

6. The spiral chute of claim 5 wherein the outer wall support includes an upper retaining tab with an aperture and a lower retaining tab, the spiral chute further comprising a handrail support post resting upon the lower retaining tab and extending through the aperture in the upper retaining tab, the handrail support post operatively coupled to the handrail such that the handrail is disposed above the first plurality of chute assembly sections.

7. The spiral chute of claim 1 further comprising a base, the center column assembly further including a base connector disposed between and operatively coupled to the base and the first center column segment.

8. The spiral chute of claim 7 wherein the base connector includes a notch and the first center column segment includes a tab that resides in the notch so as to index the first center column segment in a predetermined orientation.

9. The spiral chute of claim 7 further comprising:
a connector sleeve disposed partially into the base connector and partially into the first center column segment;
a lower clamp bar extending through the base connector and the connector sleeve;
an upper clamp bar extending through the first center column segment and the connector sleeve; and
a fastener connecting the upper clamp bar to the lower clamp bar so as to retain the first center column segment against the base connector.

10. The spiral chute of claim 9 wherein the connector sleeve includes a stiffening bar extending across opposing sides of the connector sleeve.

11. The spiral chute of claim 1 wherein the center column assembly includes a cap segment coupled to the first center column segment.

12. A method of constructing a spiral chute comprising:
supporting a first center column segment in a vertical orientation, the first center column segment being circular in transverse cross-sectional shape and having a plurality of pairs of opposed apertures arranged in a spiral configuration; and
coupling a first plurality of chute assembly sections to the first center column segment, each chute assembly section including:
a chute support arm having proximal end and a distal end, the chute support arm having a nut secured to the proximal end;
a chute section coupled to the chute support arm;
an outer wall support coupled to a distal end of the chute support arms;
an outer wall segment coupled to the outer wall supports; and
a support arm bolt having a distal end and a proximal end, wherein the distal end of each support arm bolt passes through the first center column segment and threadingly engages the nut at the proximal end of the chute support arm such that the proximal end of the chute support arm abuts the first center column segment, whereby, at each chute assembly section, the spiral chute is defined at a radially interior by the first center column segment and at a radially exterior by the outer wall segment.

13. The method of claim 12, wherein the first center column segment includes a plurality of retaining slots in a spiral configuration, the method further comprising:
inserting a retaining tab at the proximal end of the chute support arm into a corresponding one of the plurality of retaining slots.

14. The method of claim 12 further comprising:
coupling a second center column segment to the first center column segment; and
coupling a second plurality of chute assembly sections to the second center column segments such that the respective chute support arms abut the second center column segment.

15. The method of claim 12 wherein the supporting the first center segment further comprises:
securing a base to a support surface; and
coupling a base connector to the base and the first center column segment.

16. The method of claim 15 wherein the coupling the base connector further comprises:
inserting a connector sleeve partially into the base connector and partially into the first center column segment;
extending a lower clamp bar though the base connector and the connector sleeve;
extending an upper clamp bar through the first center column segment and the connector sleeve; and
connecting a fastener between the upper clamp bar and the lower clamp bar so as to retain the first center column segment against the base connector.

17. The method of claim 15 wherein the base connector includes a notch and the first center column segment includes a tab, the coupling the base connector to the first center column segment further comprises:
inserting the tab of the first center column segment into the notch of the base connector so as to index the first center column segment in a predetermined orientation.

18. A spiral chute comprising:
a center column assembly including a first center column segment, the first center column segment having a plurality of pairs of opposed apertures arranged in a spiral configuration;
a first plurality of chute assembly sections, each including
a chute support arm having proximal end and a distal end, the chute support arm having a nut secured to the proximal end;
a chute section coupled to the chute support arm;
an outer wall support coupled to a distal end of the chute support arm;
an outer wall segment coupled to the outer wall supports; and
a support arm bolt having a distal end and a proximal end, wherein the distal end of each support arm bolt passes through a corresponding one of the first plurality of opposing apertures and threadingly engages the nut at the proximal end of the chute support arm such that the proximal end of the chute support arm abuts the first center column segment, wherein the first center column segment includes a plurality of retaining slots in a spiral configuration, and wherein the proximal end of the chute support arm includes a retaining tab inserted into a corresponding one of the plurality of retaining slots.

19. The spiral chute of claim 18, wherein the proximal end of the chute support arm includes a center flange that abuts the first center column segment.

* * * * *

UNITED STATES PATENT AND TRADEMARK OFFICE
CERTIFICATE OF CORRECTION

PATENT NO. : 11,667,471 B2
APPLICATION NO. : 17/486115
DATED : June 6, 2023
INVENTOR(S) : Jeremy Kirk Stock et al.

It is certified that error appears in the above-identified patent and that said Letters Patent is hereby corrected as shown below:

In the Specification

Column 1, Lines 12-20 read, "The invention relates generally to chutes for moving articles, and specifically, spiral chutes for moving articles …" and should read -- The invention relates generally to chutes for moving articles and, more specifically, spiral chutes for moving articles… --

Column 1, Lines 43-44 read, "… invention increases the versatility of spiral chutes with respect the entry locations." and should read -- … invention increases the versatility of spiral chutes with respect to the entry locations. --

Column 3, Line 10 reads, "… segment; b) extending a lower clamp bar though the base …" and should read -- … segment; b) extending a lower clamp bar through the base … --

Column 4, Lines 65-66 read, "The length of each center column segments 52 does not have to be the same, …" and should read -- The length of each center column segment 52 does not have to be the same,… --

Column 5, Line 10 reads, "… assembly 14 will have at least of one base connector 50, one …" and should read -- … assembly 14 will have at least one base connector 50, one … --

Column 5, Lines 25-26 read, "FIGS. 4A-4C illustrate how the center column segment 52 are coupled to the base connector 50." and should read -- FIGS. 4A-4C illustrate how the center column segments 52 are coupled to the base connector 50. --

Column 5, Line 42 reads, "… includes that tabs 76 that are configured to fit within the …" and should read -- … includes tabs 76 that are configured to fit within the … --

Column 9, Lines 15-16 read, "… and ensure that the tabs 76 in the center column segment 52 rests within notches 74 …" and should read -- … and ensure that the tabs 76 in the center column segment 52 rest within notches 74 … --

Signed and Sealed this
Fifteenth Day of August, 2023

Katherine Kelly Vidal
*Director of the United States Patent and Trademark Office*

CERTIFICATE OF CORRECTION (continued)
U.S. Pat. No. 11,667,471 B2

Column 10, Line 2 reads, "… chute assembly 20 (if required by at that installation site), …" and should read -- … chute assembly 20 (if required at that installation site), … --

In the Claims

Claim 1, Column 10, Line 27 reads, "… a chute support arm having proximal end and a distal end, …" and should read -- … a chute support arm having a proximal end and a distal end, … --

Claim 1, Column 10, Lines 42-44 read, "… the spiral chute is defined at a radially interior by the first center column segment and at a radially exterior by the outer wall segment." and should read -- … the spiral chute is defined at a radial interior by the first center column segment and at a radial exterior by the outer wall segment. --

Claim 12, Column 11, Line 37 reads, "… a chute support arm having proximal end and a distal end, …" and should read -- … a chute support arm having a proximal end and a distal end, … --

Claim 12, Column 11, Lines 51-54 read, "… the spiral chute is defined at a radially interior by the first center column segment and at a radially exterior by the outer wall segment." and should read -- … the spiral chute is defined at a radial interior by the first center column segment and at a radial exterior by the outer wall segment. --

Claim 16, Column 12, Line 18 reads, "… extending a lower clamp bar though the base connector …" and should read -- … extending a lower clamp bar through the base connector … --

Claim 18, Column 12, Line 38 reads, "… a chute support arm having proximal end and a distal end, …" and should read -- … a chute support arm having a proximal end and a distal end, … --